United States Patent [19]

Pelton

[11] Patent Number: 5,234,202
[45] Date of Patent: Aug. 10, 1993

[54] GAS DISPERSION APPARATUS FOR MOLTEN ALUMINUM REFINING

[75] Inventor: John F. Pelton, Yorktown Heights, N.Y.

[73] Assignee: Praxair Technology, Inc., Danbury, Conn.

[21] Appl. No.: 656,849

[22] Filed: Feb. 19, 1991

[51] Int. Cl.⁵ .............................................. C22B 9/05
[52] U.S. Cl. .................................... 266/225; 266/235
[58] Field of Search ............... 266/200, 225, 235, 229

[56] References Cited

U.S. PATENT DOCUMENTS

| | | | |
|---|---|---|---|
| 4,203,581 | 5/1980 | Pelton | 266/217 |
| 4,373,704 | 2/1983 | Pelton | 75/680 |
| 4,401,295 | 8/1983 | Yoshida | 75/681 |
| 4,443,004 | 4/1984 | Hicter et al. | 266/229 |
| 4,526,761 | 7/1985 | Ivanov et al. | 266/233 |
| 4,784,374 | 11/1988 | Pelton | 266/215 |

*Primary Examiner*—Melvyn J. Andrews
*Attorney, Agent, or Firm*—Alvin H. Fritschler

[57] ABSTRACT

The maximum useful rate of aluminum refining is substantially increased by the incorporation of baffle means across the refining chamber under the rotor of a spinning nozzle assembly positioned in the refining chamber during aluminum refining operations.

18 Claims, 4 Drawing Sheets

GAS DISPERSION APPARATUS FOR MOLTEN ALUMINUM REFINING

BACKGROUND OF THE INVENTION

1. Field of the Invention

This invention relates to the refining of molten aluminum. More particularly, it relates to the dispersion of a gas in the molten aluminum.

2. Description of the Prior Art

Molten aluminum, as derived from most common sources, such as primary metal, scrap and re-melt ingot, usually must be purified before being cast into ingots, sheets or bars. This may be done by bubbling an inert gas, i.e. nitrogen or argon, through the aluminum in molten form. In some embodiments, a halogen gas, usually chlorine, is added, or the halogen gas may be used alone for such purification purposes. This type of treatment can remove dissolved hydrogen, alkali metals such as sodium and lithium, and small solid particles such as aluminum oxide. The effectiveness of a given volume of gas in such treatment is increased by reducing the bubble size of the gas in the molten aluminum, thereby increasing the total gas-metal surface area. The effectiveness of the gas bubbles is also increased by the dispersing of said gas bubbles throughout the body of molten aluminum to be treated. One very effective way of both making small bubbles and dispersing them is by the use of a spinning nozzle positioned in the body of molten aluminum. Commercial systems are available for this purpose, including the SNIF TM systems of Union Carbide Industrial Gases Inc. for in-line refining of metals flowing from a holder to a casting station. The Pelton patent, U.S. Pat. No. 4,784,374, discloses and illustrates a particular embodiment of said SNIF TM system.

The refining rate of such a spinning nozzle system can be increased by increasing the process gas flow rate employed therein. It is usually also necessary to increase the nozzle rotating speed to continue the desired making of small bubbles and the dispersing of said small bubbles throughout the molten aluminum in the refining zone of the system. Such increase in gas flow and nozzle rotating speed are usually accompanied by increased turbulence on the surface of the molten aluminum. The maximum refining rate of a given refining system, however, is limited by the maximum surface turbulence or roughness that can be tolerated therein.

Excessive surface turbulence is undesirable in a refining system for several reasons. Thus, the increased metal surface area that is produced thereby leads to higher reaction rates with any reactive gas that might be present. For example, oxygen from air will react to form aluminum oxide films, and water vapor from the air will react to form hydrogen in the metal and oxide films. Furthermore, when solid particles are carried to the molten metal surface by the refining gas bubbles, surface turbulence may interfere with their desired separation from the bubbles and their incorporation into the floating dross layer formed over the body of molten aluminum. Excessive turbulence may also cause floating dross to be re-dispersed into the molten aluminum. While the quantitative effects of excessive surface turbulence are difficult to measure, those skilled in the aluminum refining art are nevertheless aware from experience that high surface turbulence is undesirable, and will strive to limit such surface turbulence to levels considered acceptable in practical commercial operations.

There is a need and desire in the art to increase the aluminum refining rate of spinning nozzle systems. Thus, it is desired to increase gas flow rates and nozzle rotating speeds so as to increase the maximum useful rate of refining without the onset of excessive surface turbulence as presently encountered in such spinning nozzle systems.

It is an object of the invention, therefore, to provide an improved refining system for the production of aluminum.

It is another object of the invention to provide an aluminum refining system employing one or more spinning nozzles and capable of operating at enhanced refining rates.

It is a further object of the invention to provide a spinning nozzle aluminum refining system capable of operating at higher gas flow rates and nozzle rotating speeds without a corresponding increase in turbulence on the surface of the molten metal.

With these and other objects in mind, the invention is hereinafter described in detail, the novel features thereof being particularly pointed out in the appended claims.

SUMMARY OF THE INVENTION

The maximum useful refining capacity or rate of a spinning nozzle type aluminum refining system is increased by the incorporation of a vertical baffle or rib across the bottom of the refining chamber and under the center of the rotor of the spinning nozzle device. Further increase in capacity is achieved by the use of a unique design of the rotor of said spinning nozzle.

BRIEF DESCRIPTION OF THE DRAWING

The invention is hereinafter described with reference to the accompanying drawings in which.

DETAILED DESCRIPTION OF THE INVENTION

Figures 1, 2, 3, 4:
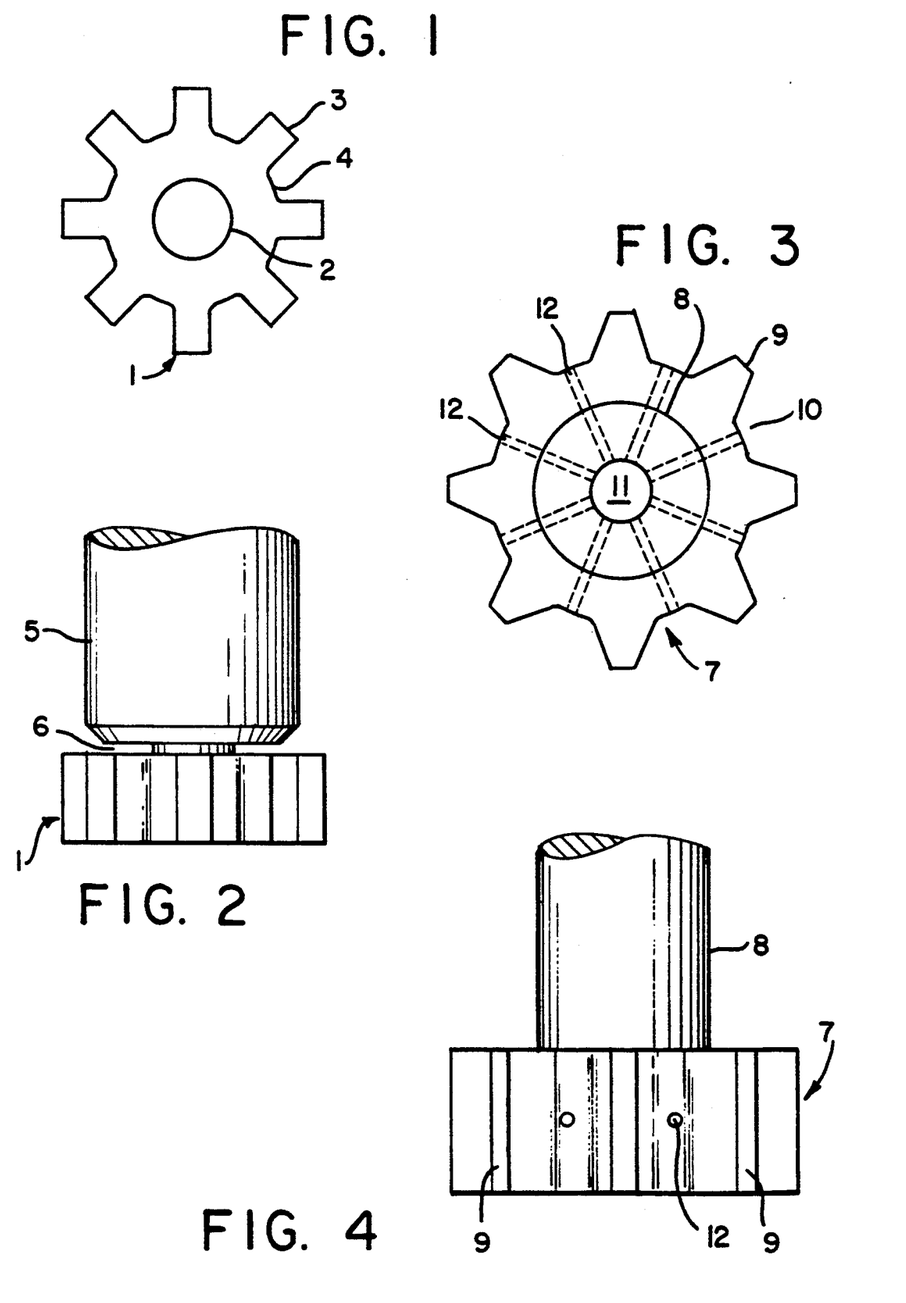
FIG. 1 is a plan view of a spinning nozzle rotor as used in the SNIF TM system referred to above.
FIG. 2 is a side elevational view of said spinning nozzle rotor and the stator commonly employed therewith.
FIG. 3 is a plan view of another type of spinning nozzle employed without a stator.
FIG. 4 is a side elevational view of the spinning nozzle of FIG. 3.

A spinning nozzle, for purposes of the invention, will be understood to comprise a cylindrical rotor having protruding vanes and some means for introducing a process gas into the space between the vanes. The rotor used in the SNIF ™ systems referred to above is shown in FIGS. 1 and 2 of the drawing, with said rotor being represented by the numeral 1 and being mounted on shaft 2 having drive means, not shown, for the rotation of said rotor 1. The rotor is illustrated as having desirable vanes 3 extending from the body thereof in a spaced apart configuration around the circumference of said rotor 1. Slots existing between individual vanes 3 are denoted by the numeral 4. Said vaned rotor 1 is shown in FIG. 2 together with stator 5 positioned around shaft 2 above said rotor. Process gas that is passed downward in the annular space between shaft 2 and stator 5 enters rotor 1 from a space 6 between the top of rotor 1 and the bottom of stator 5.

In the embodiment shown in FIGS. 3 and 4, the spinning nozzle comprises a rotor without an accompanying stator. In this embodiment, rotor 7 is mounted on shaft 8 and includes vanes 9 spaced apart around the circumference thereof, with slots 10 existing between adjacent vanes 9. Shaft 8 has hole 11 extending therethough so as to enable process gas to be passed downwardly therein to rotor 7. In order to introduce gas to the space between the vanes, i.e. to slots 10, rotor 7 contains gas exit holes 12 therein that extend from hole 11 in shaft 8 outwardly to said slots 10 between vanes 9.

Figure 5:
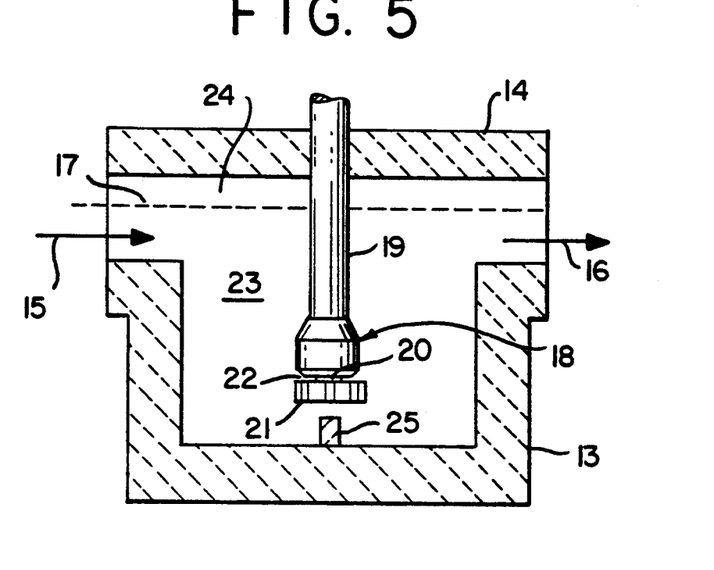
FIG. 5 is a side elevational view of a typical spinning nozzle type of molten aluminum in-line refining system, including the baffle means employed in the practice of the invention.

A typical spinning nozzle type of molten aluminum in-line refining system is illustrated in FIG. 5 of the drawings, with a rotor-stator assembly such as is shown in FIGS. 1 and 2 being included for illustrative purposes only. In this system, an insulated, refractory lined refining chamber 13 is shown with an insulated cover 14 and with molten aluminum inlet 15 and refined molten aluminum outlet 16 positioned at opposite sides thereof. During operation, the molten aluminum is maintained at a desired molten aluminum level 17 with the spinning nozzle assembly, generally represented by the numeral 18, being positioned in the molten aluminum below operating level 17 with stator 19 and shaft 20 enclosed thereby extending upward through insulated cover 14. Rotor 21 is positioned below said stator 19 so as to reduce the size of gas bubbles present in the space 22 between stator 19 and rotor 21 and to disperse said gas bubbles throughout the body of molten aluminum, which is denoted by the numeral 23, present in refining chamber 13 during aluminum refining operations therein.

Molten aluminum continuously enters refining chamber 13 through inlet 15 and is continuously refined by the action of spinning nozzle 18 as it mixes the body of molten aluminum 23 and disperses gas introduced therein through said spinning nozzle in the form of small gas bubbles and distributes said small bubbles throughout the molten aluminum. The refined molten aluminum is continuously passed from refining chamber 13 through outlet 16. Dross resulting from the extraction of solid particles and alkali metals from the molten aluminum floats on the surface of the molten aluminum and is skimmed off thereof. Hydrogen removed from the molten aluminum by the process gas bubbles enters the gas space 24 above molten aluminum operating level 17 and is removed from refining chamber 13 along with spent process gas.

Figure 6:
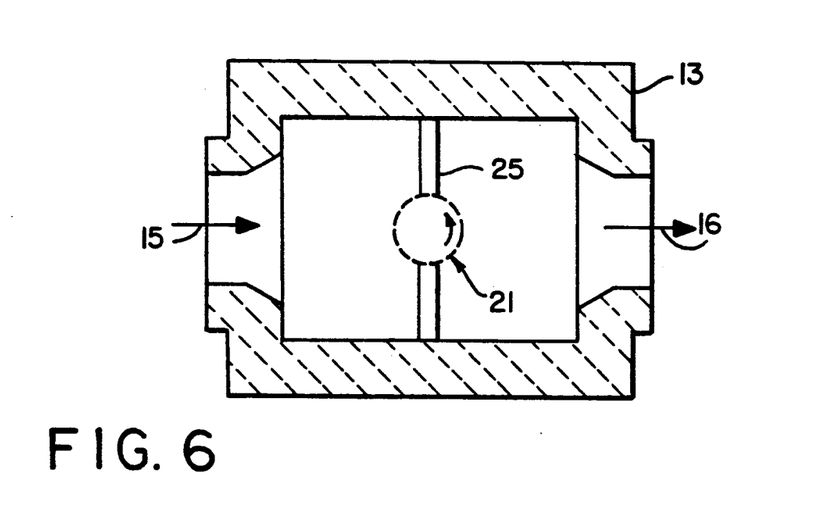
FIG. 6 is a plan view of the spinning nozzle system of FIG. 5.
Figure 7:
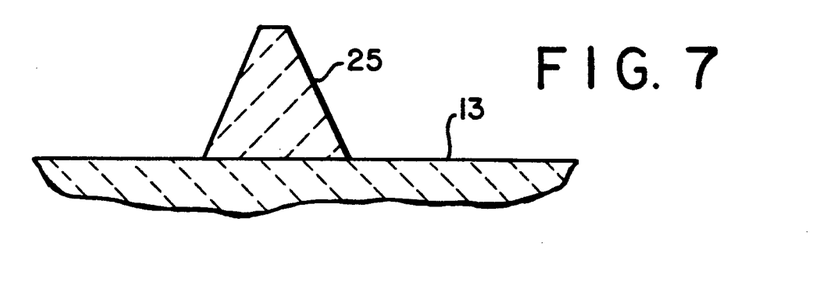
FIG. 7 is a cross-sectional view of a particular embodiment of said baffle means used in the practice of the invention.

In the practice of the invention, vertical baffle means 25 is positioned across the bottom of the interior of refining chamber 13 under rotor 21 to increase the maximum useful refining capacity of the spinning nozzle aluminum refining system. As shown in FIG. 6, baffle means 25 is advantageously positioned under the center of rotor 21. Baffle means 25 may be a simple rectangular sheet of refractory material, sufficiently thick to have adequate strength for its intended purpose. A convenient shape for said baffle means 25 in practical operating systems is shown in FIG. 7, whereby the roughly triangular cross-section is strong enough to resist mechanical damage during post-refining cleaning operations and also provides slanting surfaces that make it easier to clean the bottom of refining chamber 13 than if baffle means had vertically extending walls as in the FIG. 5 embodiment.

Figure 8:
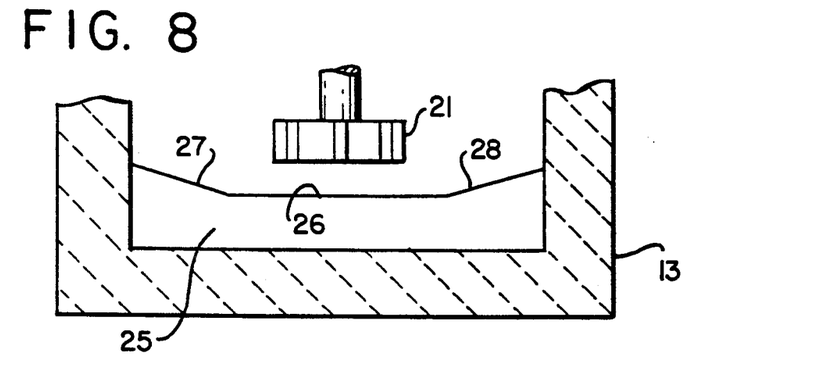
FIG. 8 is a side elevational view of a particular embodiment of the spinning nozzle refining system of the invention incorporating a particular baffle means configuration.

In the FIG. 8 embodiment, baffle means 25 is shown as having a constant height section 26 under the center and in the vicinity of rotor 21, with raised end sections 27 and 28 extending upward in the direction of the side walls of refining chamber 13. This increasing height baffle means has been found to provide a small increase in refining effectiveness, but it is not an essential feature of the invention.

The spinning nozzle used in aluminum refining is usually positioned at the center of a rectangular refining chamber as shown in FIG. 6. It should be noted, however, that the spinning nozzle may be located off center in said refining chamber if convenient for some reason, such as convenience of construction or access. In any event, the baffle means of the invention preferably will be positioned under the center of the rotor element of the spinning nozzle. It should be noted that, if the refining chamber is rectangular with approximately vertical sides, said baffle means may be positioned parallel to either the short side, as in the FIG. 6 embodiment, or the long side of the rectangle. However, it is generally most effective when positioned parallel to the short side. Refining chamber 13 may also have a slanting wall, such as wall 29 of FIG. 9, at one end of refining chamber 13, or at one side thereof, to facilitate cleaning or emptying of the chamber. In such embodiments, baffle means 25 is preferably positioned parallel to the base of slanting wall 29.

The useful height of the baffle means of the invention will be understood to depend upon the operating circumstances pertaining to any particular refining application, e.g. the size of the refining chamber and of the spinning nozzle employed therein. Typical refining systems presently in use have spinning nozzles ranging in size from about 7" to 10" in diameter and about 2½" to 4" in height. Typical refining chambers are about 20" to 30" in width, about 30" to 40" in length, with molten metal depths of about 25" to 35". For such sized systems, the height of the baffle means of the invention is typically about 2" to 8" or more, with the baffle height preferably being from about 3" to about 5".

The distance between the top of the baffle means of the invention and the bottom of the spinning nozzle rotor may be varied from a fraction of an inch, e.g. on the order of about ⅛", up to about 4" or more. It should be noted that a very small clearance, e.g. ⅛", will work well in relatively clean molten aluminum. In practice, however, small, hard pieces of refractory from upstream sources may inadvertently be present in the molten aluminum. Such pieces of refractory can become caught between the baffle of the invention and the rotor, causing breakage of the rotor or its shaft, typically made of graphite. From a practical operating viewpoint, therefore, it is generally desirable to employ a clearance in the range of from about 2" to about 3" between the top of the baffle means and the bottom of the rotor. A clearance of about 2" over a baffle 4" high, for example, will avoid the likelihood of damage from most kinds and sizes of refractory pieces commonly found in operating SNIF TM systems for the refining of aluminum.

The practice of the invention was illustrated in the following examples based on typical water model tests. For such purposes, full size models of the refining chamber and the spinning nozzle were employed. Water was circulated through the model at a volumetric flow rate equivalent to the aluminum metal flow rate being evaluated. Oxygen is dissolved in the water by bubbling air therethrough in a separate chamber, and the dissolved oxygen content of the incoming and outflowing water was measured. The incoming water contained generally about 7 ppm of dissolved oxygen. The spinning nozzle was operated with nitrogen as the process gas. The nozzle operation in the water model simulation thus acted to strip oxygen out of the water in a manner corresponding to that by which hydrogen is stripped out of molten aluminum in actual aluminum refining operations. The system performance is derived from measurements of oxygen removal at various liquid flow rates, nozzle operating parameters, i.e. gas flow, rotating speed and design, and overall refining system design.

Since the process gas in an aluminum refining system is heated to a temperature of about 700° C. in actual operation, it expands to about 3 times its original volume under ambient conditions. In order to provide the same volume of gas in the water employed in the water model tests as is used in the molten aluminum being refined in actual practice, the gas flow in the water model is set at 3 times the gas flow being modeled or simulated. With respect to the examples below, reference is made herein to the gas flow being simulated rather than to the three times this volume actually employed.

EXAMPLE NO. 1

Figure 9:
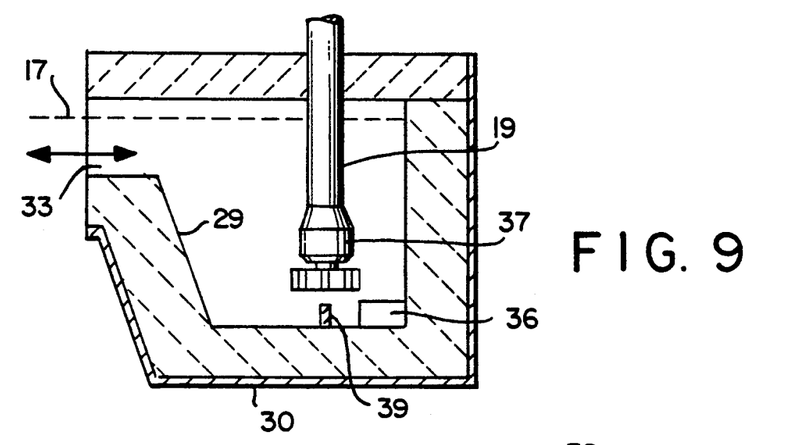
FIG. 9 is a side elevational view of a particular aluminum refining chamber useful in the practice of the invention.
Figure 10:
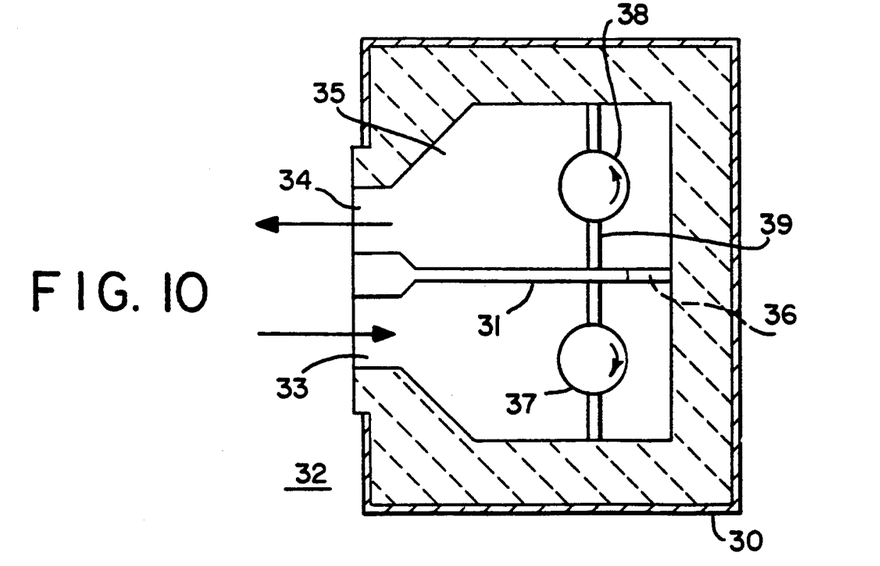
FIG. 10 is a plan view of the aluminum refining chamber of FIG. 9.

A model was made of the refining system shown in FIGS. 9 and 10. As shown in FIG. 10, the model simulates a two-nozzle system in which refining chamber 30 has a partition 31 therein that serves to separate the operating space into two separate refining compartments, with molten aluminum being passed into first compartment 32 through inlet 33 and with refined molten aluminum being discharged from the system through outlet 34 from second compartment 35. Crossover hole 36 in partition 31 enables molten aluminum to pass from first compartment 32 to second compartment 35. Spinning nozzle assembly 37 is positioned in said compartment 32, and a second spinning nozzle assembly 38 is positioned in said compartment 35.

Each compartment was 24" wide and 30" long at the bottom. Front wall 29 of each compartment was slanted at an angle of 20° to facilitate emptying and cleaning. The liquid depth during operation was about 30". Nozzles 37 and 38 were centered in the 24" direction. Each said nozzle was positioned about 12" from the back wall to provide reasonable access for cleaning from the front of the model. The rotor and stator used in each compartment were of the type shown in FIGS. 1 and 2, with the outer diameter of the rotor being 7½", and the rotor height being 2 7/16". The rotor was formed with 8 vanes, each of which were 1¼" long and 1" wide. The bottom of the rotor was 4½" above the bottom of the refining chamber in each compartment. When such a system is operated in an aluminum foundry, the maximum refining rate is usually set at 4½" CFM of argon per nozzle, with the rotating speed of the nozzle being about 500 RPM. Under these conditions, the metal surface is as turbulent as intolerable in most practical commercial operations. A much smoother and much more desirable surface condition is obtained by operating at only 3 CFM of argon flow and 450 RPM nozzle speed. These conditions are frequently used in customary practice even though the refining rate, as measured in water model tests is reduced to about 75% of the refining rate for the maximum higher gas flow and nozzle speed indicated above. In water model testing simulating these two operating conditions, it was found that the resulting surface turbulences matched fairly well with the observed turbulence encountered in actual refining system operations.

In accordance with the invention, baffle 39, which was 3½" high by ¾" thick, was then placed under the center of the rotor of nozzles 37 and 38 and parallel to slanting front wall 29 and to the back wall of refining chamber 30. When the thus modified system was operated at 610 RPM and a simulated gas flow rate of 5 CFM, the surface was as good, i.e. free of undue turbulence, as it was without baffle 39, at 500 RPM and 4½ CFM but the refining rate was advantageously increased by over 50%. When the modified system was operated at a simulated rate of 450 RPM and 3 CFM, the surface of the liquid was as desirably smooth as it had been without incorporation of baffle 39 in the system and at said 450 RPM and 3 CFM, but the refining rate was increased by about 35%.

EXAMPLE NO. 2

A rotor of the type shown in FIGS. 3 and 4 was placed at the center of a rectangular refining chamber 24"×30" with all vertical walls. The liquid depth during operation was maintained at about 30". Rotor 7 was 10" in diameter by 4" high with 8 vanes about 1¼" long. Process gas was injected through holes 12 in the rotor between vanes 9 for exit into slots 10 between said vanes. The bottom of rotor 7 was 3" above the bottom floor of the chamber. The maximum operating condition for a relatively smooth surface was at a simulated gas flow of 3 CFM and at 200 RPM rotor speed. Under such conditions, there were occasional undesirable upward eruptions from the liquid surface due to the undesired existence of large gas bubbles.

The nozzle was then raised 2" to provide a bottom clearance of 5", and the baffle of the invention, 3½" high by ¾" thick, was placed under the center of the rotor and oriented parallel to the shorter wall of the chamber. In this embodiment of the practice of the invention, the nozzle could be operated at a simulated rate of 5 CFM gas flow and a speed of 250 RPM with the surface of the liquid being as smooth as that obtained at the lower maximum operating conditions of conventional practice. In fact, the liquid surface was even better in the practice of the invention than previously in that there were none of the undesirable upward eruptions referred to above. Furthermore, the refining rate was increased by 70% in the practice of the invention.

In a preferred embodiment of the invention, even better refining rates were obtained at a given surface roughness by the use of a special rotor in conjunction with the use of the baffle means of invention. This rotor is shown in plan view in FIG. 11 and in side view in conjunction with a desirable stator shape in FIG. 12. The essential difference between the special rotor and a conventional vaned rotor as shown in FIGS. 1 and 2 is that the liquid entry from the bottom of the rotor is partially restricted, while liquid entry from the top of the rotor is not so restricted. The special rotor design also directs the flow of liquid from the bottom into the base of the rotor slots and in a mostly upward direction. In addition, this special rotor configuration presents a continuous circular shape on its lower outer edge. This shape is much less subject to damage from hard solid pieces of foreign material that may be drawn up and into the rotor during commercial operations.

Figure 11:
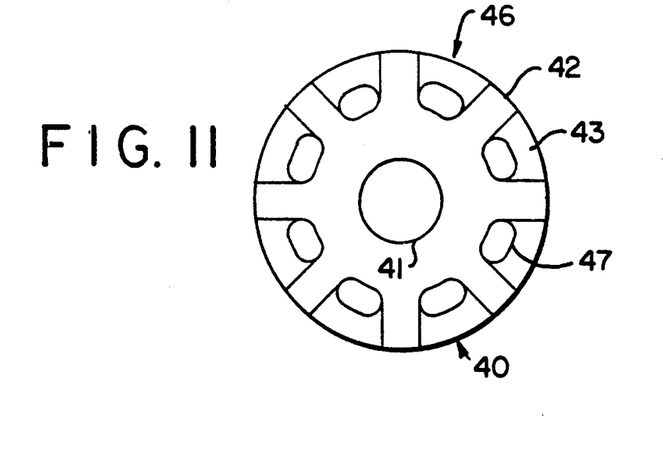
FIG. 11 is a plan view of a particularly desirable rotor for use in the practice of the invention.
Figure 12:
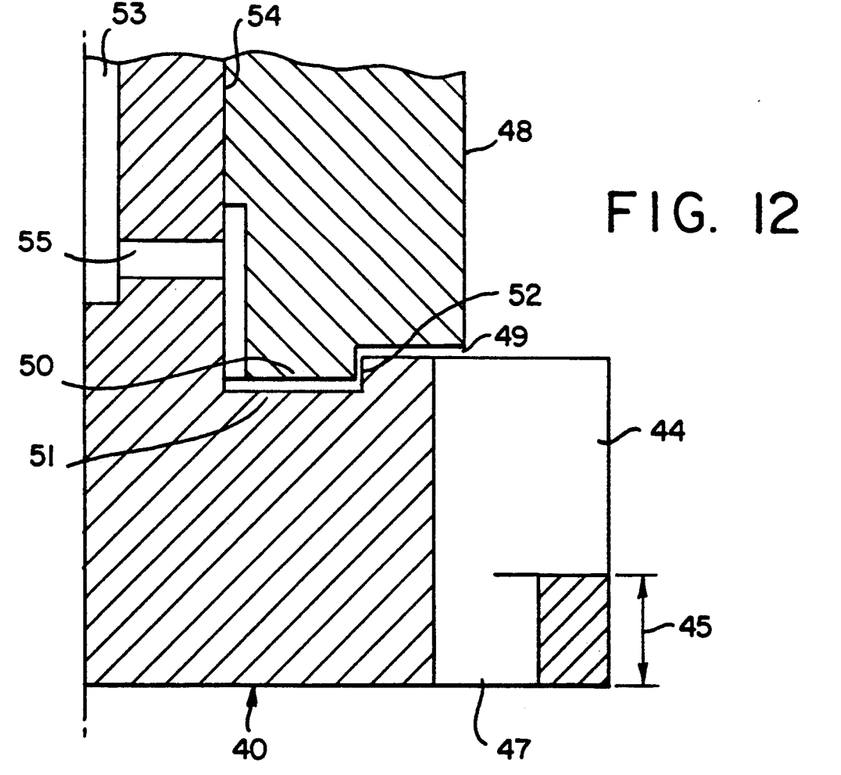
FIG. 12 is a side elevational view of the rotor of FIG. 11 together with a stator used in conjunction therewith in an embodiment of the invention.

The special rotor, represented by the numeral 40 and mounted on rotor drive shaft 41 in FIG. 11, has vanes 42 positioned around the rotor periphery, with slots 43 located between adjacent vanes. As shown in FIG. 12 and unlike the rotor of FIGS. 1–4, slots 43 do not extend for the full height of adjacent vanes 42 but for only a slot portion 44 thereof. Below said slot portion 44, restricted portion 45 remains and forms, together with adjacent vanes 42, a cylindrical base portion 46 of rotor 40, as will be seen in FIG. 11. In order to provide for passage of molten aluminum from the region below the rotor to slot portion 44, openings or holes 47 are provided in each said restricted portion 45. Said openings 47 are preferably positioned essentially at the innermost end of restricted portion 45, and provide access for molten aluminum to slot portion 44 of each slot 43, preferably toward the innermost portion thereof for enhanced molten liquid flow effect.

In the use of the invention, it is desirable that the process gas enter the rotor continuously and uniformly in all rotor slots 44. However, the turbulent motion of the liquid as it approaches the rotor from above tends to produce a non-uniform gas flow to the rotor. If, for example, the liquid momentarily flows toward the rotor more rapidly from one side thereof, it tends to shut off the gas exiting on that side and to increase the flow to other parts of the rotor. This tendency can be reduced by making the gap 49 between the top of rotor 40 and the bottom of stator 48 very small so as to produce an appreciable pressure drop at this point. For such purpose in practice, however, it is necessary to reduce this gap to about 0.020" or less for most embodiments. Since the gap is set during assembly of the rotor-stator unit at a desired plant location, the achieving of this very small gap is dependent upon the care and skill with which it is assembled. In addition, the gap can change in operation due to temperature changes and the like. A more suitable means for achieving such gas flow control is thus desired for practical commercial applications.

As shown in FIG. 12, a preferred means of achieving desired gas flow control is obtained simply by the inclusion of a stator boss and corresponding rotor recess. Thus, boss portion 50 is provided at the bottom end of stator 48 and is adapted to fit into a recess portion 51 at the top of rotor 40. The small gap passage required to Produce more uniform gas distribution throughout the rotor is provided by radial gap 52 between the outside diameter of boss 50 and the inside diameter of recess 51 on the side toward rotor slot 44. This gap 52 can be controlled at the point of manufacture and is not dependent, as is a conventional small gap between the top of the rotor and the bottom of the stator, upon the care and skill of assembly of the rotor-stator unit. Small radial gap 52 will generally be controlled at about 0.025", although somewhat larger or smaller distances can also be employed depending upon the overall structure of the unit and of the refining chamber and application with which it is to be employed. In this preferred embodiment, stator boss portion 50 and rotor recess portion 51 can both be about ¼" high or deep in common practice. The vertical gap 49 between the bottom of stator 48 and the top of rotor 40 and between the bottom of stator boss portion 50 and the top of rotor recess portion 51, can be set at a greater tolerance, e.g. about 1/16" with the exact setting not being critical for the desired gas flow control purposes. As shown in the illustrated embodiment of FIG. 12, process gas passes downward through gas entry passage 53 adjacent rotor shaft-stator bearing 54, and through gas passageway 55 to stator-rotor gap 49, including small radial gap 52 for the desired gas flow control. The gas exits from stator-rotor gap 49 and enters rotor slots 44 in a continuous and uniform manner. The stator diameter is preferably made slightly larger than the root diameter of the rotor, i.e. the diameter at the base of the vanes, so that the process or sparging gas is caused to pass downward into the rotor slots by the downward flow of molten aluminum, and none of said process gas is allowed to escape upward and avoid being dispersed by the action of the rotor. When no stator is employed, the process gas is introduced into the rotor via holes that lead to the spaces between rotor vanes as shown in FIGS. 3 and 4. In the absence of a stator, it may be desirable to employ a cylindrical abutment to essentially duplicate the function of the stator in directing the flow of process gas downward.

The area of the openings 47 in restricted portion 45 in the bottom of the rotor in relation to the total opening, if unrestricted, is generally in the range of from about 25% to about 75%, with an opening area of about 50% being preferred. The height of restricted portion 45 of rotor 40 should be generally in the range of from about 20% to about 40% of the overall rotor height, with a restricted portion height of about 30% being preferred for use in typical sized refining chamber units.

The rotor as shown in FIG. 11 has rounded corners at the base of the vanes, and the holes for molten aluminum entry from below the rotor also have rounded edges. While the radii thereof are not essential to the performance of the rotor, they result from a convenient means of machining the rotor by cutting slots and entry holes therein with a vertically oriented end mill.

EXAMPLE NO. 3

The system as described with respect to Example 1 was employed in further tests using the baffle means of the invention except that the special rotor configuration described above was employed, together with a stator of preferred size. The rotor had the same general dimensions as that employed in Example 1 except for the restricted portion 45 at the bottom of the rotor. This restricted portion was ¾" high, and openings 47 and the corner radii were formed with a 0.75" end mill. Openings 47 were 1.24" long, and 0.75" wide. The stator was 5½" in outside diameter, resulting in an outer edge overlapping the base of the slots by ¼".

In water model tests employing the special rotor, it was found that the rotor could be operated at 600 RPM and a simulated gas flow of 5 CFM to give the same, very desirable smooth liquid surface previously obtained only at 3 CFM simulated gas flow and 450 RPM. The refining rate achievable in this embodiment, when operating at conditions of smooth surface, was 100% greater than that obtainable using a conventional rotor configuration in a refining chamber not equipped with the baffle means of the invention but operated at the conditions of smooth surface as indicated above.

The practice of the invention provides an advantageous advance in the aluminum refining art. The incorporation of the baffle means described herein in the refining chamber serves to change the flow pattern of molten aluminum within the chamber so as to enable high gas flows and/or nozzle rotating speeds to be employed to achieve increased aluminum refining rates without encountering the excessive surface turbulence of the molten aluminum that otherwise limits the desired increase in gas flows and nozzle rotating speeds. The baffle means of the invention is believed to reduce rotational flow along the bottom of the refining chamber that otherwise inhibits desirable smooth upward flow of molten aluminum into the rotor, and the achieving of a suitable and stable balance of downward and upward molten aluminum flow into the rotor. The embodiment of the invention in which the special rotor configuration described above is employed has been found particularly advantageous, with the controlled upward flow of molten aluminum enabling particularly enhanced gas flow rates and nozzle rotating speeds to be employed without undue surface turbulence.

It will be understood that various changes and modifications can be made in the details of the invention without departing from the scope of the invention as set forth in the appended claims. Thus, while reference is made herein to aluminum refining in general, the invention can be practiced with respect to aluminum or to the various alloys thereof. The invention can be practiced in systems having refining chambers having one or more refining compartments or stages, each of which is adapted for the positioning of a spinning nozzle assembly therein during aluminum refining operations. In a typical two-stage refining system, molten aluminum is commonly passed into the inlet of the first stage and removed from the outlet from the second stages. The separate compartments are separated by a baffle adapted to enable molten aluminum to flow from the first stage to the second stage. Other such systems can incorporate more than two such refining stages therein. The bottom baffle means of the invention will desirably be employed in each refining compartment. Said baffle means can be constructed of any suitable refractory material suitable for incorporation in the refining chamber. Silicon carbide is a generally preferred material of construction for this purpose, although other refractories, e.g. graphite, can also be employed. While the baffle means is preferably positioned so as to be located under the center of the rotor portion of the spinning nozzle assembly upon placement thereof in the refining chamber, the baffle means may also be otherwise positioned so as to be located under said rotor portion, but should not be positioned beyond the periphery of the rotor.

The invention will thus be seen, in enabling the maximum useful rate of refining in a refining chamber to be substantially increased over conventional practice, to provide a highly desirable and useful advance in the aluminum refining art.

I claim:

1. In an insulated refractory lined refining chamber for aluminum refining, adapted for the positioning of a spinning nozzle assembly therein for the injection of sparging gas into molten aluminum present in the chamber during aluminum refining operations, the improvement comprising:
   (a) vertical, refractory baffle means positioned at the floor of and across said refining chamber, so as to be located under the rotor portion of said spinning nozzle assembly upon placement of said spinning nozzle assembly in the refining chamber for aluminum refining operations therein; and
   (b) a spinning nozzle assembly having a rotor portion positioned therein, whereby said baffle means serves to change the flow pattern of molten aluminum within the refining chamber upon the use thereof for refining operations so as to enable higher gas flows and/or nozzle rotating speeds to be employed without excessive surface turbulence of said molten aluminum, thereby enabling increased refining rates to be achieved in said refining chamber.

2. The refining chamber of claim 1 in which said rotor portion of the spinning nozzle assembly is a vaned rotor containing alternate vanes and slots around the periphery of the rotor.

3. The refining chamber of claim 2 in which said slots extend throughout the height of the rotor.

4. The refining chamber of claim 2 in which said slots extend only a portion of the length downward from the top of the rotor with restricted portions thereunder, said restricted portions containing openings therein for the passage of molten aluminum therethrough.

5. The refining chamber of claim 4 in which said openings are positioned at the innermost portion of said slots.

6. The refining chamber of claim 4 in which said restricted portions have a height in the range of from about 20% to about 40% of the overall height of the rotor vanes.

7. The refining chamber of claim 6 in which said height of the restricted portion is about 30%.

8. The refining chamber of claim 4 in which the area of the openings in said restricted portion in relation to the total opening, if unrestricted, is in the range of from about 25% to about 75%.

9. The refining chamber of claim 8 in which said area of the openings is about 30%.

10. The refining chamber of claim 8 in which said restricted portions have a height of about 20% to about 40% of the overall height of the rotor vanes, the height of said baffle means being from about 2" to about 8", the distance between the top of said baffle means and the bottom portion of the rotor being from about ½" to about 4".

11. The refining chamber of claim 10 in which said height of the baffle means is from about 3" to about 5", said distance from the top of the baffle means to the bottom portion of the rotor is from about 2" to about 3".

12. The refining chamber of claim 11 in which said baffle means is positioned so as to be located under the center of the rotor portion of the spinning nozzle assembly upon placement thereof in the refining chamber.

13. The refining chamber of claim 4 in which said spinning nozzle assembly includes a stator portion positioned above said rotor portion thereof.

14. The refining chamber of claim 13 in which the diameter of said stator is slightly larger than the root diameter of said vaned rotor.

15. The refining chamber of claim 1 in which said baffle means is positioned under the center of the rotor portion of said spinning nozzle assembly.

16. The refining chamber of claim 1 in which the height of said baffle means is from about 2" to about 8" in the portion thereof beneath the rotor portion of said spinning nozzle assembly.

17. The refining chamber of claim 1 in which the distance between the top of said baffle means and the bottom of the rotor portion of said spinning nozzle assembly as in the range of from about ½" to about 4".

18. The refining chamber of claim 1 in which the height of said baffle means is about 4" and the distance from the top thereof to the bottom of said rotor portion of said spinning nozzle assembly is from about 2" to about 3".

* * * * *